(12) United States Patent
Nakhmanovich et al.

(10) Patent No.: US 8,182,078 B2
(45) Date of Patent: May 22, 2012

(54) INKS, PRINTING METHODS AND PRINTING DEVICES

(75) Inventors: Gregory Nakhmanovich, Netanya (IL); Marian Cofler, Lod (IL); Kobi Markowitz, Rehovot (IL)

(73) Assignee: Hewlett-Packard Development Company L.P., Houston, TX (US)

( * ) Notice: Subject to any disclaimer, the term of this patent is extended or adjusted under 35 U.S.C. 154(b) by 1134 days.

(21) Appl. No.: 11/723,824

(22) Filed: Mar. 22, 2007

(65) Prior Publication Data

US 2008/0231679 A1  Sep. 25, 2008

(51) Int. Cl.
*B41J 2/16* (2006.01)
*B41J 2/175* (2006.01)
*B41J 2/01* (2006.01)

(52) U.S. Cl. ............. 347/102; 347/51; 347/93; 347/101

(58) Field of Classification Search ............. 347/20, 347/21, 51, 84, 85, 95, 100
See application file for complete search history.

(56) References Cited

U.S. PATENT DOCUMENTS

| | | | |
|---|---|---|---|
| 2002/0158937 A1* | 10/2002 | Pietrzyk et al. | 347/21 |
| 2004/0246323 A1* | 12/2004 | Ishikawa | 347/102 |
| 2006/0066703 A1* | 3/2006 | Kadomatsu et al. | 347/102 |

* cited by examiner

*Primary Examiner* — Matthew Luu
*Assistant Examiner* — Kendrick Liu (57) ABSTRACT

There is provided a printing device that includes an ink applicator and a shaping fluid outlet adapted to dispense a shaping fluid onto curable ink applied by the applicator. The printing device may further include energy emitting source used to at least partially cure the applied ink. There is further provided a curable ink mixture, the mixture includes a colorant at a concentration higher than 4%. There is further provided, a method for printing that includes applying curable ink on a substrate and shaping the ink by dispensing a shaping fluid.

28 Claims, 5 Drawing Sheets

INKS, PRINTING METHODS AND PRINTING DEVICES

BACKGROUND

Ink jet printing is a technology by which ink is applied to a substrate through jet nozzle located at the print head of ink-jet printer. Ink-jet printers may generally be divided into two types, based on the mode by which ink is dispensed through the print head. One type is known in the art as continuous ink jet printers, in which ink is being distributed from the print head in a continuous stream, which is then broken into uniform droplets that would later be directed to their final destination. The second type of ink jet printers is known in the art as drop on demand. In this type of printers a drop is created and ejected from the print head on a given cue only if it is to be applied to a substrate. The basic ingredients of ink composition are vehicle, colorant and additives, a combination of which gives the ink its unique properties. Various kinds of ink compositions exist for wide range of printing purposes and for a variety of substrate requirements. For example, inks may be water based, inks may be based on volatile organic solvents or non volatile oils. Another kind of ink jet ink is UV-curable ink.

UV curable ink is composed of such chemical components that allow it to polymerize and solidify in response to irradiation, hence cure on a substrate. A typical UV curable ink composition may include a combination of chemical components such as: photoinitiators, monomers, oligomers, colorants, diluents, resins and surfactants.

The typical and more common irradiation source for UV-curable inks is UV light source. However, depending upon the ink ingredients, it may also be cured by irradiation using other energy sources, such as electron bean. The curing process is a chemical reaction in which the activated monomers and oligomers ingredients of the ink polymerize to produce solid ink that is cured on a substrate. The polymerization reaction is initiated by irradiation of the ink that has been applied to a substrate, generally by using a UV light source, leading to photo-activation of the photoinitiators components of the ink mixture. These activated photoinitiators may now activate the monomers and oligomers of the ink composition and as a result a polymerization reaction may proceed. Depending on the ingredients of the ink composition, UV-curable inks exhibit varying degrees of viscosity at room temperature. Ink-Jet printing requires low viscosity inks for jetting, but higher viscosity is essential for controlling drops on the printed surface.

The colorant ingredients within the ink composition determine the color properties of the ink. The two main groups of colorants are dyes and pigments. Dyes are substances that are soluble in ink vehicle. They are less frequently used in UV-curable inks due to their low resistance to UV radiation and can mainly be found in water or solvent based inks designed for indoor applications. Pigments are small particle of colorants that are non soluble in the ink vehicle. They usually have higher resistance to UV light and therefore are the more frequently used colorants in UV-based inks and in solvent or water based inks for outdoor applications. Pigments are usually low-soluble small crystals that may be divided into two subgroups, based upon their chemical structure: non-organic pigments that are mainly used in achromatic (colorless) inks; and organic pigments, which account for colored inks.

Some of the advantages of using UV-curable ink include: safer to use because they exhibit no or very low Volatile Organic Compound (VOC) emissions, fast drying, low energy requirements and excellent mechanical properties, which allow them to be used on a wide range of substrates, in particular non-porous substrates such as plastic, glass, metal. However, there are also several disadvantages when using the current forms of UV-curable ink: when the UV inks are jetted onto porous substrates, the ink can penetrate the substrate, resulting in poor image quality, diluted color and bleed-through. Furthermore, depending upon the ink composition, additional instrumentation may be included to allow the liquefaction (for example by heating) of the ink composition prior to being jetted from the printer. In addition to increasing the costs of using the UV-curable ink printer, the printing speed is also limited. Another disadvantage of using the current compositions of UV-curable inks is the relatively high costs of these inks, attributed mainly to the high cost of ink ingredients, such as monomers, oligomers and photoinitiators. There is thus a need in the art for new ink compositions, methods of printing and printing devices that would improve the printing efficiency and cost.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other advantages or improvements.

There is provided, according to some embodiments, a printing device that includes an ink applicator and a shaping fluid outlet adapted to dispense a shaping fluid onto curable ink applied by the applicator. The printing device may further include energy emitting source used to at least partially cure the applied ink.

There is provided, according to some embodiments a curable ink mixture, the mixture includes a colorant at a concentration higher than 4%. The mixture further includes a surfactant.

There is further provided, according to some embodiments a method for printing that includes applying curable ink on a substrate and shaping the ink by dispensing a shaping fluid. The method may further include curing the ink by energy emission.

In addition to the exemplary aspects and embodiments described above, further aspects and embodiments will become apparent by reference to the figures and by study of the following detailed descriptions.

BRIEF DESCRIPTION OF THE FIGURES

FIG. 4A' schematically illustrates a cross section of the ink drops, taken along line a-a of FIG. 4A;

FIG. 4B' schematically illustrates a cross section of the ink drops, taken along line b-a of FIG. 4B;

FIG. 4C' schematically illustrates a cross section of the ink drops, taken along line c-c of FIG. 4C.

DETAILED DESCRIPTION

In the following description, various aspects of the invention will be described. For the purpose of explanation, specific configurations and details are set forth in order to provide a thorough understanding of the invention. However, it will also be apparent to one skilled in the art that the invention may be practiced without specific details being presented herein. Furthermore, well-known features may be omitted or simplified in order not to obscure the invention.

Printing Device

Figure 1:
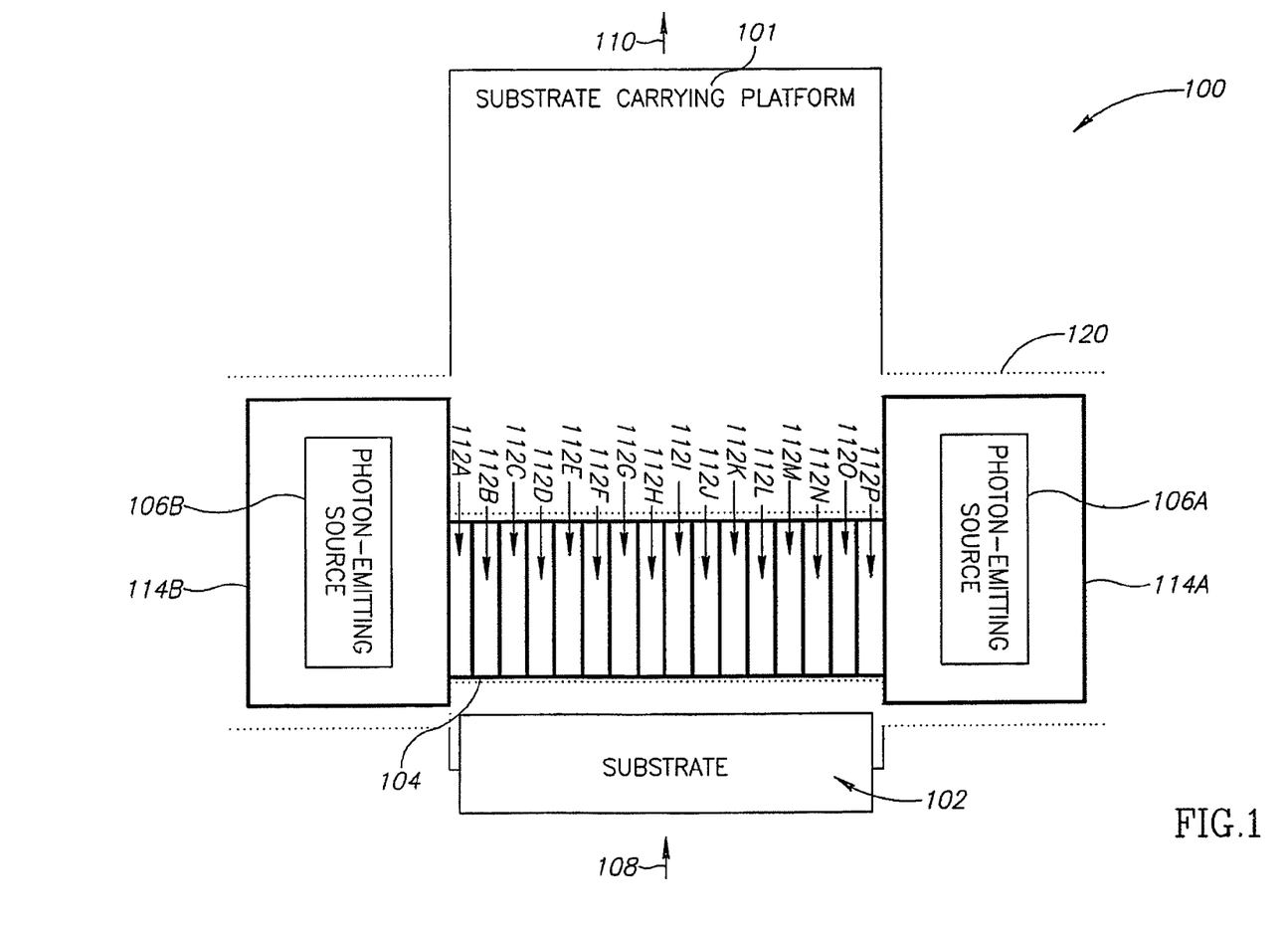
FIG. 1 schematically illustrates a block diagram of a top view of an existing printing device.

Reference is now made to FIG. 1, which schematically illustrates an existing form of a printing device. The printing device (100) includes a substrate-carrying platform (101) onto which a substrate (102) is loaded. The printing device (100) further includes a printing module (120) that includes: a printing system (104), from which ink can be dispensed onto substrate (102), and photon emitting sources (106A-B), used to cure ink on the substrate (102). The printing device (100) has two longitudinally opposite ends: a front end (108) and a rear end (110). The front end (108) is the end from which the substrate (102) is loaded into the printing device (100). The rear end (110) is the end from which a substrate (102) may exit the printing device (100) and it is located downstream to the front end (108). The term downstream, as referred to herein may be related to a relative location in a direction from the front end (108) to the rear end (110), along an imaginary axis that runs between the ends. The term upstream, as referred to herein may be related to a relative location in a direction from the rear end to the front end, along an imaginary axis that runs between the two axes. The substrate-carrying platform (101) is adapted to carry the substrate (102) and advance the substrate (102) along the printing device (100). The substrate-carrying platform (101) may advance the substrate (102) in a stepwise unidirectional mode at either a predetermined or changeable rate.

The printing module (120) of the printing device (101) may include a printing system (104) that is located perpendicularly to the substrate-carrying platform (101). The printing system (104) of FIG. 1 includes 16 print heads (112A-P) (but may include any number of print heads) each of which may carry an array of ink jet nozzles (that may be linear or non-linear, not shown). The print heads may be arranged in longitudinal direction to a substrate (102), longitudinal being an imaginary line stretched between the front end and the rear end of the printing device. Ink may be dispensed from the jet nozzles (not shown) that are located in the print heads (112A-P) onto the substrate (102) in any method known in the art as drop on demand. On a given cue, the ink jet nozzles (not shown) may eject ink onto the substrate (102).

The printing module (120) of the printing device (100) may include at least one photon-emitting source, shown in FIG. 1 as two photon-emitting sources (106A-B), used to at least partially cure the ink drop onto the substrate (102). The photon-emitting sources (106A-B) are parallel (but may be also unparallel aligned) to each other and are located adjacent to and on both sides of the printing system (104). The photon-emitting source, such as photon-emitting sources (106A-B), may include an Ultra Violet (UV) lamp that emits light at a range of wavelengths.

The printing module (120) may move bi-directionally at continuous rate perpendicularly to direction of the substrate motion. The ink may be dispensed from the jet nozzles (not shown) that are located in the print heads (112A-P) onto the substrate (102) when the printing module (120) moves in one single direction, for example when it moves athwart sideways right or left. The ink may also be dispensed when the printing module (120) moves in both sideways (left and right) directions.

The photon-emitting sources (106A-B) are situated in a photon-emitting source housing (114A-B) that is located on the printing module (120), parallel to the printing system (104) in such manner that when the printing module (120) moves and the print heads dispense the ink, the ink drops are exposed to UV light in short time (usually less than 1 second) after dispensing. It allows freezing the drops on substrate and preventing bleeding the ink and penetrating into the substrate.

According to some embodiments, there is provided a printing device including an ink applicator and a shaping fluid outlet adapted to dispense a shaping fluid onto ink applied by the applicator. The printing device may be, for example, a drop on demand inkjet printer.

According to some embodiments, the shaping fluid outlet may include an array of nozzles and the shaping fluid outlet may be located in parallel, or upstream or downstream to the ink applicator. The shaping fluid outlet may be situated at a distance of about 0-800 mm from the ink applicator. For example, the distance may be about 135 mm. The distance between the shaping fluid outlet and the ink applicator may be adjustable within a range of 0-800 mm.

According to some embodiments, the shaping fluid outlet may be located at an angle relative to the substrate-carrying platform. The shaping fluid outlet may be located at an angle relative to an imaginary line perpendicular to the substrate-carrying platform. The angle may be fixed or variable at the range of 0 to 90 degrees, for example, 30 or 45 degrees.

According to some embodiments, the shaping fluid may be adapted to flatten the applied ink. The applied ink may be an ink droplet that was applied onto the substrate. The shaping fluid may be dispensed immediately, or at a time delay after application of the ink. The shaping fluid may include any fluid in gaseous state, such as, but not limited to air, nitrogen, argon, carbon dioxide or any combination thereof.

The device may be adapted to provide a time delay between the application of the ink and the dispensing of said shaping fluid. The time delay may be between 0-120 seconds.

According to some embodiments, the device may further include at least one energy emitting source adapted to at least partially cure said ink. The shaping fluid outlet may be located downstream to the ink applicator. The shaping fluid outlet may be located upstream to the ink applicator. The shaping fluid outlet may be located substantially parallel to the ink applicator.

According to some embodiments, the printing device may include an energy-emitting source adapted to at least partially cure the applied ink. The energy-emitting source may include for example a photon-emitting source, such as, a UV light-emitting source. For example, a UV photon-emitting source may include mercury lamp, light emitting diode (LED), Xenon lamp, laser or any combination thereof. The energy-emitting source may include for example an electron beam source. The energy-emitting source may be located upstream or downstream to the shaping fluid outlet at a distance of about 0-400 mm from the shaping fluid outlet. For example, the distance between the energy emitting source and the shaping fluid outlet may be about 200 mm. The energy-emitting source may include any combination of a photon-emitting source and an electron-emitting source.

The energy emitting source is adapted to emit energy at a time delay (for example 0-10 minutes, specifically about 0.1-1 minutes) after dispensing the shaping fluid onto the ink. The energy-emitting source may be situated at a changeable distance from said ink applicator. The distance may be adjustable within a range of 0 to 1500 mm.

According to some embodiments, an additional energy-emitting source adapted to at least partially cure the applied ink may be located upstream to the shaping fluid outlet. The additional energy-emitting source adapted to at least partially cure the applied ink may be located in parallel or downstream to the printing system. For example, the additional energy-emitting source may emit energy after ink has been applied onto the substrate, and prior to the deformation of the ink droplet by the shaping fluid. The additional energy-emitting source may include for example at least one photon-emitting source, such as mercury lamp; light emitting diode (LED), Xenon lamp, laser or any combination thereof.

According to some embodiments, the ink applied by the printing device may include a colorant at a concentration of above 4% (weight). The colorant may include a dye, pigment, or any combination thereof. For example, the pigment may include an organic pigment, an inorganic pigment, or any combination thereof. The ink may further include a surfactant.

Figure 2:
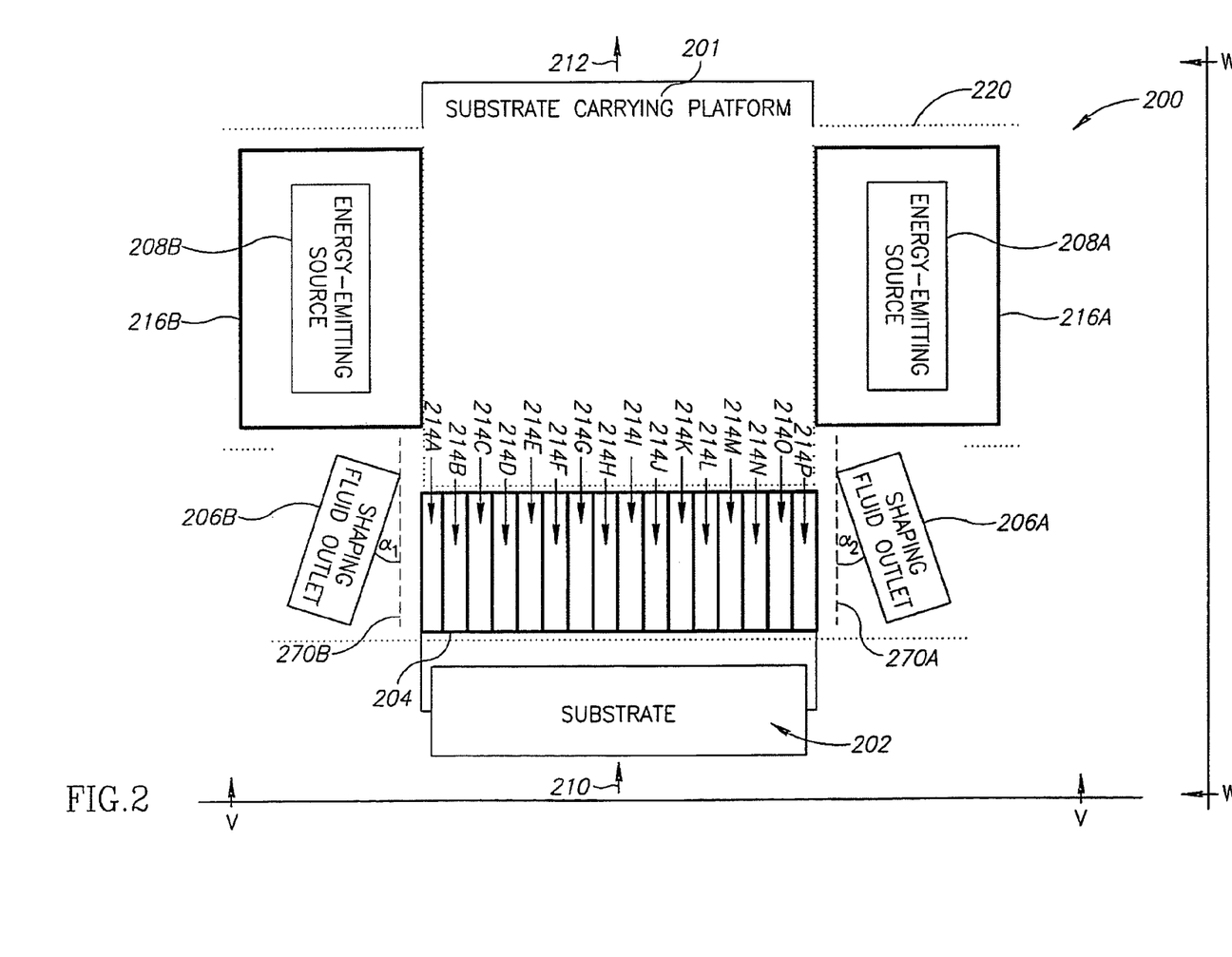
FIG. 2 schematically illustrates a block diagram of a top plain view of printing device according to some embodiments.
Figure 3A:
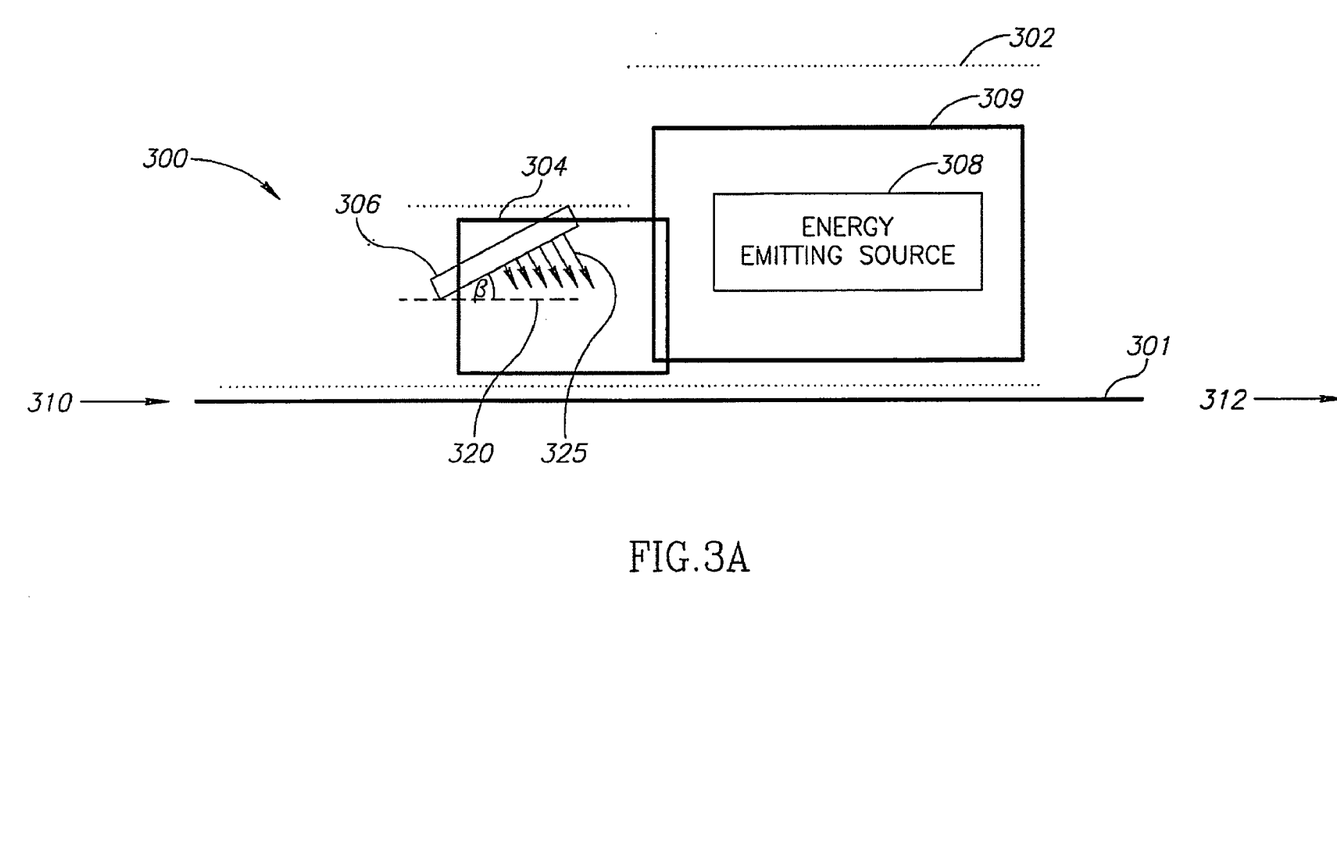
FIG. 3A schematically illustrates a block diagram of a side perspective of printing device according to some embodiments.

Reference in now made to FIG. 2, which schematically illustrates a printing device in accordance with some embodiments; FIG. 3A, which schematically illustrates a side perspective viewed along the line W-W of FIG. 2; and to FIG. 3B, which schematically illustrates a front perspective viewed along the line V-V of FIG. 2. The printing device (FIG. 2, 200, FIG. 3A, 300, FIG. 3B 350) includes a substrate-carrying platform (FIG. 2, 201, FIG. 3A, 301, FIG. 3B, 351), onto which a substrate (FIG. 2, 202) is loaded. The printing device (FIG. 2, 200, FIG. 3A, 300 and FIG. 3B, 350) also includes a printing module (FIG. 2, 220, and FIG. 3A, 302 and FIG. 3B, 352). The printing module includes a printing system (FIG. 2, 204, FIG. 3A; 304 and FIG. 3B, 354), from which ink is dispensed and applied onto the substrate (FIG. 2, 202). The printing module (FIG. 2, 220, FIG. 3A, 302 and FIG. 3B, 352) also includes at least one shaping fluid outlet, (shown as two shaping fluid outlets (FIG. 2, 206A-B and FIG. 3B, 356A-B) and as one shaping fluid outlet in FIG. 3A (306)), that are adapted to dispense a shaping fluid (such as illustrated in FIG. 3A, lines 325) onto the applied ink. The printing module (FIG. 2, 220, FIG. 3, 302 and FIG. 3B, 352) also includes at least one energy-emitting source, (shown as two energy-emitting sources (FIG. 2, 208A-B and FIG. 3B, 358A-B) and as one energy emitting source in FIG. 3A (308)), that are adapted to at least partially cure the shaped ink on the substrate. The energy emitting sources may be situated in energy emitting source housing (FIG. 2, 216A-B, FIG. 3A, 309 and FIG. 3B, 359A-B), According to some embodiments, the printing device may have two longitudinally opposite ends: a front end (FIG. 2, 210, and FIG. 3A, 310) and a rear end (FIG. 2, 212, and FIG. 3A, 312). The front end is the end onto which a substrate (FIG. 2, 202) may be loaded into the printing device (FIG. 2, 200, FIG. 3A, 300 and FIG. 3B, 350). The rear end (FIG. 2, 212 and FIG. 3A, 312) is the end from which a substrate (FIG. 2, 202) may exit the printing device (FIG. 2, 200 and FIG. 3A, 300) and it is located downstream to the front end (FIG. 2, 210, and FIG. 3A, 310).

Reference in now made to FIG. 2, which schematically illustrates a printing device in accordance with some embodiments. According to some embodiments, the printing device may have two longitudinally opposite ends, a front end (210) and a rear end (212). The front end (210) is the end onto which a substrate (202) may be loaded into the printing device (200). The rear end (212) is the end from which a substrate (202) may exit the printing device (200) and it is located downstream to the front end (210). The term downstream, as referred to herein may be related to a relative location in a direction from the front end to the rear end, along an imaginary axis that runs between the ends. The term upstream, as referred to herein may be related to a relative location in a direction from the rear end to the front end, along an imaginary axis that runs between the two axes. The substrate-carrying platform (201) is adapted to carry the substrate (202) and advance the substrate (202) along the printing device (200). The substrate-carrying platform (201) may advance the substrate (202) in a stepwise unidirectional mode at either a predetermined or changeable rate. The printing module (220) of the printing device (201) may include a printing system (204), located perpendicularly to the substrate-carrying platform (201). The printing system (204) includes 16 print head (214A-P), but may include any number of printing heads. Each of the print heads (214A-P) may carry an array of ink jet nozzles (that may be linear or non-linear, not shown). The print heads may be arranged in longitudinal direction to the substrate-carrying platform (201), longitudinal being an imaginary line stretched between the front end and the rear end of the printing device. Ink may be dispensed from the jet nozzles (not shown) located in the print heads (212A-H) onto the substrate (202) in any method known in the art as drop on demand. On a given cue, the ink jet nozzles (not shown) may eject ink onto the substrate (202).

According to some embodiments, the printing module (220) of the printing device (200) may include at least one shaping fluid outlet, shown in FIG. 2 as two shaping fluid outlets (206A-B), used to dispense shaping fluid on the ink applied on the substrate (202). The shaping fluid outlets (206A-B) may be parallel to each other and may be located parallel and adjacent to the printing system (204), and on both sides of the printing system (204). The shaping fluid outlets may be situated downstream to the printing system (204).

The printing module (220) of the printing device (200) may include at least one energy emitting source, shown in FIG. 2 as two energy emitting sources (208A-B), used to at least partially cure the ink drop onto the substrate (202). The energy emitting sources (208A-B) may be situated in energy-emitting sources housing (216A-B). The energy emitting sources may be parallel to each other and may be located downstream to the shaping fluid outlets (206A-B), in parallel, or upstream to the shaping fluid outlets The energy-emitting source (such as energy emitting sources 208A-B) may include for example a photon-emitting source, an electron-emitting source and the like.

The printing module (220) may move bi-directionally athwart at continuous rate perpendicularly to direction of the substrate-carrying platform (201). The ink may be dispensed from the jet nozzles (not shown) that are located in the print heads (214A-P) onto the substrate (202) when the printing module (220) moves in one single sideway direction, for example when it moves right or left. The ink may also be dispensed when the printing module (220) moves in both sideways (left and right) directions.

Substrate Carrying Platform

According to some embodiments, a substrate may be loaded onto a substrate-carrying platform, which carries and advances the substrate longitudinally along the printing device. Longitudinal being an imaginary line stretched between the front end and the rear end of the printing device.

The substrate-carrying platform may advance the substrate at any rate and in any longitudinal direction, e.g. downstream or upstream.

According to some embodiments, the substrate-carrying platform may advance the substrate longitudinally in only one direction, for example, downstream, from the front end towards the rear end of the printing device.

According the some embodiments, the substrate-carrying platform may advance the substrate at a predetermined rate. The rate at which the stepwise unidirectional substrate-carrying platform is advancing the substrate may be at about 1 to 120 meter per hour (m/h). The rate may be about 50 to 90 m/h. For example, the rate may be about 72 m/h.

According to some embodiments, the constant rate at which the continuous unidirectional substrate-carrying platform is advancing the substrate may be controlled automatically.

According to some embodiments, the substrate-carrying platform onto which a substrate is loaded may advance a substrate longitudinally, unidirectional at an interrupted-rate.

According to some embodiments, the substrate-carrying platform may advance a substrate at a variable rate that may be at a range of about 1-600 m/h. The rate may be at a range of about 200-400 m/h. For example, the rate may be at about 300 m/h.

According to some embodiments, the interrupted rate at which the substrate is advanced by the substrate-carrying platform may be preprogrammed.

According to some embodiments, the substrate-carrying platform may advance the substrate longitudinally, bi-directionally at interrupted rates.

According to some embodiments, the substrate-carrying platform may move the substrate in two alternating opposite longitudinal directions, longitudinal being an imaginary line stretched between the front end and the rear end of the printing device. For example it may advance the substrate downstream from the feeding end towards the rear end of the printing device. Alternatively, the substrate-carrying platform may move the substrate upstream from the rear end of the printing device towards the feeding end.

According to some embodiments, the moving direction of the substrate loaded onto the substrate-carrying platform may be preprogrammed.

According to some embodiments, the bidirectional substrate-carrying platform may advance the substrate at a constant rate that may be at a range of about 1-600 m/h. The rate may be at a range of about 200-400 m/h. For example, the rate may be at about 300 m/h.

According to some embodiments, the bidirectional substrate-carrying platform may advance the substrate at a variable rate that may be at a range of about 1-600 m/h. The rate may be at a range of about 200-400 m/h. For example, the rate may be at about 300 m/h.

According to some embodiments, the variable rate at which the bidirectional substrate-carrying platform is advancing the substrate may be preprogrammed.

The term substrate as referred to herein may include any substance on which ink may be applied. Such substances may include paper, synthetic paper, glass, metal, fabric, polymeric sheets (such as polyacrylic sheets, polycarbonate sheets, polyolephine sheets, polystyrene sheets, melamine sheets polyvinyl chloride sheets, nylon sheets), flexible PVC, self-adhesive vinyl, mesh or the like. The substrate may vary in thickness, strength, softness, elasticity, flexibility, density, or the like.

According to some embodiments, the printing device may further include a coating substance outlet that may apply any coating substance on a substrate. The coating substance may improve wetting of the substrate by the inks. For example, the coating substance may include such substances as, but not limited to water, solvent based solutions of dimetylpolysiloxane polymers, such as BYK 307, BYK 333, BYK 341, BYK 345, BYK 348 (obtained from BYK Chemie), solutions of acrylic polymers such as BYK 354, BYK 381 (obtained from BYK Chemie) or any other coating substance or a combination of coating substances. The coating substance outlet may apply a coating substance prior to ink deposition on the substrate. The coating substance outlet may apply the coating substance in any application method such as, but not limited to: spraying, injecting, dispensing, spreading.

Printing System

According to some embodiments, a printing module (FIG. 2, 220) of a printing device (FIG. 2, 200) may include a printing system (FIG. 2, 204), located perpendicularly to the substrate-carrying platform (FIG. 2, 201) and at any height in the range of about 0-100 mm above the substrate-carrying platform. The printing system is an ink applicator that applies ink onto the substrate (FIG. 2, 202). The printing system may include at least one print head (such as the print head presented in FIG. 2, 214A or B-P), or any number of print heads. Each print head may carry an array of ink jet nozzles (that may be linear or non-linear, not shown). The print heads may be arranged in longitudinal direction to a substrate (FIG. 2, 202), longitudinal being an imaginary line stretched between the front end and the rear end of the printing device. Ink may be dispensed from the jet nozzles (not shown) that are located in the print heads (FIG. 2, 214A-P) onto the substrate (FIG. 2, 202) in any method known in the art as drop on demand. On a given cue, the ink jet nozzles (not shown) may eject ink onto the substrate (FIG. 2, 202).

According to some embodiments, the printing system may further include an ink reservoir, ink supply, solvent supply, pumps or any other element as described herein or in any of the known art. For example, such as described in U.S. Pat. No. 6,575,555.

According to some embodiments, the printing system may move athwart from side to side perpendicularly to direction of the substrate carrying platform advancement at a range and rate predetermined by the user.

Shaping Fluid Outlet

According to some embodiments, the printing module may include at least one shaping fluid outlet (such as the shaping fluid outlet presented in FIG. 2, 206A or B) adapted to dispense a shaping fluid onto ink applied by the printing system (such as, printing system 204 in FIG. 2). The shaping fluid outlet may be located upstream or in parallel to the printing system. The shaping fluid outlet may be located downstream to the printing system, closer to the rear end (such as the rear end 212 in FIG. 2) of the printing module (such as the printing module 220 in FIG. 2). The dispensed shaping fluid may be applied at any delay time after ink has been dispensed onto a substrate (such as the substrate 202 in FIG. 2).

According to some embodiments, the shaping fluid outlets (such as the shaping fluid outlets presented in FIG. 2, 206A-B) may be situated on the printing module (such as printing module 220 in FIG. 2) in parallel or downstream to the printing system (such as printing module 204 in FIG. 2) in such manner that the ink drops which are dispensed from the printing heads (such as print heads 214A-P in FIG. 2) are exposed to the shaping fluid immediately or at a short delay after dispensing. The shaping fluid may be dispensed from the shaping fluid outlet onto the ink drops when the printing module moves in one sideway direction, for example when it moves right or left. The shaping fluid may also be dispensed when the printing module moves sideways in both (left and right) directions.

According to some embodiments, the shaping fluid outlet may be located at any angle relative to the printing system and the substrate-carrying platform. The angle may be fixed or changeable and may be within the range of about 0-90 degrees. The shaping fluid outlet may be located upstream, or in parallel or downstream to the printing system.

Figure 3B:
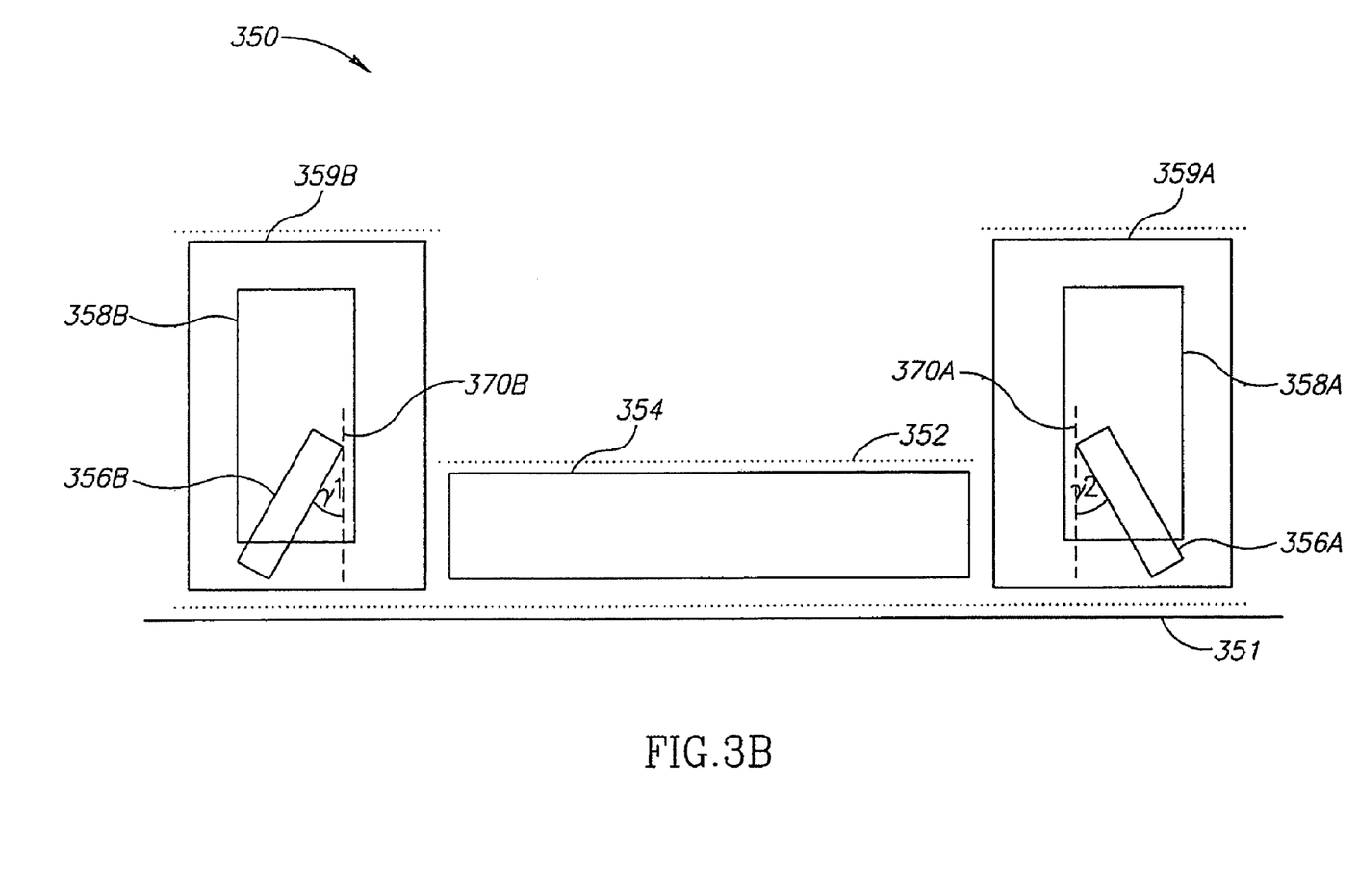
FIG. 3B schematically illustrates a block diagram of a front perspective of printing device according to some embodiments.

According to some embodiments, the shaping fluid outlet may be located at an angle $\alpha$ (such as illustrated in FIG. 2, $\alpha 1$ and $\alpha 2$) relative to the printing system, wherein angle $\alpha$ is the angle between the shaping fluid outlet and an imaginary line (lines 270A-B in FIG. 2) that is perpendicular to the substrate-carrying platform. The angle $\alpha$ may be an acute angle at the range of about 0-90 degrees, for example, about 30 or 45 degrees. In a preferred embodiment, $\alpha$ may be 0 degrees. The shaping fluid outlet may be further located at an angle $\beta$ (such as angle $\beta$, illustrated in FIG. 3A) relative to the substrate carrying platform, wherein angle $\beta$ is the angle between the shaping fluid outlet and an imaginary line (line 320, in FIG. 3A), which is parallel to the substrate carrying platform. The angle $\beta$ may be an acute angle at the range of about 0-90 degrees, for example, about 30 or 60 degrees. In a preferred embodiment, angle $\beta$ may about 45 degrees. The shaping fluid outlet may be further located at an angle $\gamma$ (such as illustrated in FIG. 3B, $\gamma 1$ and $\gamma 2$) relative to the substrate carrying platform. The angle $\gamma$ is the angle the forms between the shaping fluid outlet and an imaginary line (lines 370A-B in FIG. 3B) that is perpendicular to the substrate carrying platform. The angle $\gamma$ may any angle in the range of 0-90 degrees. In a preferred embodiment, angle $\gamma$ is 0 degrees.

According to some embodiments, the shaping fluid outlet may include at least one array of nozzles that may dispense fluid onto the ink drop after it has already been applied to the substrate by the printing system.

According to some embodiments, the shaping fluid outlet may be located at a fixed distance in the range of about 0-800 mm from the printing system, upstream, or in parallel or downstream to the printing system. The distance may be at a range of about 50-600 mm. For example, the distance may be about 135 mm. According to some embodiments, the shaping fluid outlet may be located at a fixed distance from the energy-emitting source, upstream, or in parallel or downstream to the energy-emitting source.

According to some embodiments, the shaping fluid outlet may be situated on longitudinal outlet-supporting rail. The outlet-supporting rail may be fixed to the printing module, parallel to the printing system, or at any angle relative to the printing system. The outlet supporting rails may be located at any angle relative to the printing system and substrate-carrying platform. The angle may be fixed or changeable and within the range of about 0-90 degrees. The shaping fluid outlet may be moved longitudinally along the outlet-supporting rail and fixed at any position along the rail, thus enabling to change the distance between the shaping fluid outlet and the printing system. The distance between the shaping fluid outlet and the printing system may be changed in a range of about 0-800 mm. The distance may be at a range of about 50-600 mm. For example, the distance may be about 135 mm.

According to some embodiments, changing the distance between the shaping fluid outlet and the printing system by moving the shaping fluid outlet along the outlet-supporting rail may be performed manually, prior to beginning of the printing process, or automatically.

According to some embodiments, the shaping fluid outlet may dispense shaping fluid at any delay time after the ink has been applied to a substrate by the printing system. For example, the shaping fluid outlet may dispense fluids in a delay time of about 0-120 seconds after ink has been applied to the substrate.

According to some embodiments, the fluid dispensed from the shaping fluid outlet may include any substance at its gas state of aggregation form. For example, the fluid may include air, nitrogen, argon, carbon dioxide or any combination thereof or any other appropriate fluid. The fluid dispensed from the shaping fluid outlet may be dispensed by any pump suitable for gaseous fluids, for example piston pump, diaphragm pump, gear pump, peristaltic pump or any other appropriate dispensing method.

According to some embodiments, the amount of fluid dispensed by the shaping fluid outlet may be at a range of about 1-500 l/min. The amount may be at a range of about 100-400 l/min. For example, the amount of fluid dispensed by the shaping fluid outlet may be about 250 l/min.

According to some embodiments, the fluid dispensed from the shaping fluid outlet may deform the shape and size of the ink droplet applied onto a substrate. For example, the fluid dispensed from the shaping fluid outlet may cause ink drops to be flattened onto the substrate. The ink droplet may thus decrease in height and thickness (flatten) and increase in diameter. Consequently, color density of the printed image may increase.

For example: the shaping fluid outlet may include an "air-knife" (may also be named "air nozzle", "air flat nozzle"), comprising of at least one array of air nozzles (that may be linear or non linear). The air nozzles may dispense pressurized air onto the ink droplets after they have already been applied to the substrate by the printing system. The "air knife" is located on the printing system and may be located upstream or in parallel or downstream to the printing system at a distance of about 135 mm. In this manner, the air is dispensed at the ink droplets at a short delay after the ink has been applied to the substrate. The delay time may be determined by the rate at which the substrate is moving on the substrate-carrying platform and the distance between the "air knife" and the printing system.

According to further embodiments, the printing module may include at least two shaping fluid outlets (such as the shaping fluid outlet presented in FIG. 2, 206A and B) that may be fixed to the printing module (such as printing module 220 in FIG. 2). The shaping fluid outlets may be located upstream to the printing system (but aligned to the printed area direction) or parallel to the printing system (such as printing system 204 in FIG. 2). Alternatively, the shaping fluid outlets may be located downstream to the printing system. The shaping fluid outlets may be located upstream, in parallel or downstream to the energy-emitting source. The shaping fluid outlets may be located at any height relative to the printing system, such as in the range of about 0-100 mm. The shaping fluid outlets may be located on opposite sides of the printing system and the distance between the shaping fluid outlets may be at least the length of the printing system. The shaping fluid outlets may each be independently located at any angle relative to the printing system and the substrate-carrying platform (such as angles $\alpha 1$ and $\alpha 2$, illustrated in FIG. 2, angle $\beta$, illustrated in FIG. 3A and angles $\gamma 1$ and $\gamma 2$, illustrated in FIG. 3B). The angle may be fixed or changeable and within the range of about 0-90 degrees.

According to some embodiments, the shaping fluid outlets may each be situated on longitudinal outlet-supporting rail. The outlet-supporting rails may be parallel to each other and be fixed to the printing module. The outlet-supporting rails may be located perpendicularly to the printing system and on opposite sides of the printing system. Alternatively, the outlet-supporting rails may each be independently located at any angle relative to the printing system and the substrate-carrying platform. The angle may be fixed or changeable and within the range of about 0-90 degrees. The outlet-supporting rails may be situated at any height relative to the printing system. The height may be fixed or changeable at the range of about 0-100 mm. The outlet-supporting rails may be situated at any height relative to the substrate-carrying platform. The height may be fixed or changeable at the range of about 0-100 mm. The shaping fluid outlets may be moved, independently or simultaneously along the outlet-supporting rails and fixed at any position along the rails, thus enabling to change the distance between the shaping fluid outlet and the printing system. The distance between the shaping fluid outlet and the printing system may be changed in about 0-400 mm. Changing the distance between the shaping fluid outlet and the printing system by moving the shaping fluid outlets along the outlet-supporting rails may be performed manually, prior to the beginning of the printing process or automatically.

According to some embodiments, each of the shaping fluid outlets may, independently, include at least one array of nozzles that may dispense fluid onto the ink droplet after it has already been applied to the substrate by the printing system.

According to some embodiments, the shaping fluid outlets may be identical outlets, in structure and operation mechanism, comprising of the same components and mode of action. The identical shaping fluid outlets may operate simultaneously and dispense the exact same fluid.

According to some embodiments, the shaping fluid outlets may be identical outlets, in structure and operation mechanism, comprising of the same components and mode of action. The identical shaping fluid outlets may operate simultaneously and dispense different fluids.

According to some embodiments, the shaping fluid outlets may be identical outlets, in structure and operation mechanism, comprising of the same components and mode of action. The identical shaping fluid outlets may dispense the exact same fluid at different time points (delay time) after ink has been applied to the substrate by the printing system.

According to some embodiments, the shaping fluid outlets may be identical outlets, in structure and operation mechanism, comprising of the same components and mode of action. The identical shaping fluid outlets may dispense dissimilar fluids and operate at different time points (delay time) after ink has been applied to the substrate.

According to some embodiments, the shaping fluid outlets may be non-identical outlets, in either/both structure and operation mechanism. The non-identical shaping fluid outlets may operate simultaneously and dispense the same fluid.

According to some embodiments, the shaping fluid outlets may be non-identical outlets, in either/both structure and operation mechanism. The non-identical shaping fluid outlets may dispense the same fluid but operate at different time points (delay time) after ink has been applied to the substrate.

According to some embodiments, the shaping fluid outlets may be non-identical outlets, in either/both structure and operation mechanism. The non-identical shaping fluid outlets may operate at different time points (delay time) after ink has been applied to the substrate, and dispense non-similar fluids.

According to some embodiments, the shaping fluid outlets may be non-identical outlets, in either/both structure and operation mechanism. The non-identical shaping fluid outlets may operate simultaneously after ink has been applied to the substrate, and dispense non-similar fluids.

Energy Emitting Source

According to some embodiments, the printing module may include at least one energy-emitting source adapted to at least partially cure the deformed ink on the substrate.

According to some embodiments, the energy-emitting source (such as presented in FIG. 2, 208A or B) may be situated in energy emitting source housing (such as presented in FIG. 2, 216A or B) that may be located on the printing module (220, FIG. 2). Herein, referring to the location of energy emitting source(s) may also include referring to the location of the energy source(s) housing. The energy-emitting source may be located downstream to the shaping fluid outlet (206A or B, FIG. 2), closer to the rear end (such as rear end, 212, FIG. 2) of the printing device. Once the deformed ink on the substrate has reached the energy-emitting source (such as energy-emitting source 208A-B, FIG. 2), the source may irradiate and as a result the ink may be at least partially cured. The time difference between the deformation of the ink by the shaping fluid and the final curing may be determined by the rate at which the substrate is moving on the substrate-carrying platform and the distance between the shaping fluid outlet and the energy emitting source. The energy emitting source may be located in parallel or upstream to the shaping fluid outlets.

According to some embodiments the energy-emitting source may be located at any angle relative to the printing system and the shaping fluid outlet. The angle may be fixed or changeable. The energy-emitting source may be located downstream to the shaping fluid outlet, closer to the rear end of the printing device.

According to some embodiments, the energy-emitting source may be situated on longitudinal energy-emitting source supporting rail. The energy-emitting source supporting rail may be fixed to the printing device, perpendicularly to the printing system, or at any angle relative to the printing system, the angle may be fixed or changeable. The energy-emitting source may be moved longitudinally along the energy-emitting source supporting rails and fixed at any position along the rails, thus enabling to change the distance between the energy-emitting source and the shaping fluid outlet. The distance between the energy emitting source and the shaping fluid outlet may be changed at a range of about 0-400 mm.

According to some embodiments, changing the distance between the energy-emitting source and the shaping fluid outlet by moving the energy-emitting source along the energy-emitting source supporting rails, may be performed manually, prior to beginning of the printing process, or automatically.

According to some embodiments the energy-emitting source may include at least two energy-emitting sources that are each may be located in energy-emitting source housing that may be fixed to the printing module. The energy-emitting sources may be located downstream to the shaping fluid outlet, closer to the rear end of the printing device. Alternatively, the energy-emitting sources may be located upstream or in parallel and at any angle relative to the shaping fluid outlet. The energy emitting sources may be located on opposite sides of the printing system and the distance between the two sources may equal at least the length of the printing system. The energy emitting sources may operate simultaneously or at different time points (delay time) after ink has been applied to the substrate.

According to some embodiments, any one of the energy-emitting sources may be situated on longitudinal energy-emitting source supporting rails. The energy-emitting source supporting rails may be parallel to each other and be fixed to the printing module. The energy-emitting source supporting rails may be located perpendicularly to the printing system. Alternatively, the energy-emitting source supporting rails may be located at any angle relative to the printing system. The angle may be fixed or changeable. Any one of the energy-emitting sources may be moved, independently or simultaneously along the energy-emitting source supporting rails and fixed at any position along the rails, thus enabling to change the distance between the energy-emitting sources and the shaping fluid outlets. The distance between the energy-emitting sources and the shaping fluid outlets may be changed by about 0-400 mm. For example, the distance may be about 200 mm. Changing the distance between the energy-emitting sources and the shaping fluid outlets by moving the energy-emitting sources along the energy-emitting source-supporting rails may be performed manually, prior to the beginning of the printing process or automatically.

According to some embodiments, any one of the energy-emitting sources may include a photon-emitting source, such as but not limited to: Light Emitting Diode (LED), emitting light at a specific predetermined wavelength; mercury lamp, emitting light at a range of wavelengths; a fixed pulsed Xenon lamp, a pulsed Xenon lamp; laser emitting light at a specific predetermined wavelength or any combination thereof.

According to some embodiments, the photon emitting sources may include emitting light at a wavelength within the UV wavelength range.

According to some embodiments, the LED may emit light at a wavelength of about 350-450 nm. For example, the LED may emit light at a wavelength of about 395 nm.

According to some embodiments, the mercury lamp may emit light at a wavelength in the range of about 200-500 nm. The mercury lamp may also be equipped with a cut-off filter, designed to constrict the wavelength range emitted from the lamp.

According to some embodiments, the energy-emitting source may include an electron beam energy source.

According to some embodiments the energy-emitting sources may include photon emitting sources, such but not limited to LED, mercury lamp, Xenon lamp, laser or any combination thereof; and/or an energy source such as, but not limited to Electron Beam energy source.

According to some embodiments, the distance between the photon emitting source and the shaping fluid outlet may be changeable in the range of about 0-400 mm. By moving either the photon emitting source or the shaping fluid outlets on their respective supporting rails.

According to some embodiments, the distance between the photon emitting source and the shaping fluid outlet may be fixed at about 200 mm.

According to some embodiments, the changeable distance between the photon emitting source and the shaping fluid outlet may be changed manually, prior to the beginning of the printing process, or automatically.

According to some embodiments, the delay time between the irradiation by the photon emitting source and the deformation of the ink drop by the fluid dispensed by the shaping fluid outlet may be at a range of about 0-120 seconds.

According to some embodiments, the printing module may be permanently fixed to the printing device, as illustrated in FIG. 2. Alternatively, the components of the printing module such as printing system, shaping fluid outlet, photon emitting source or any combination thereof may move athwart either uniformly or independently of each other.

According to some embodiments, the printing system may be situated on longitudinal rail, named printing system carrying rail. The printing system may athwart slide on the rail, from side to side of the printing module.

According to some embodiments, an additional energy-emitting source may be situated in an energy emitting source housing that may be located upstream to the shaping fluid outlet. The additional energy-emitting source may be fixed to the printing module. The additional energy-emitting source may be fixed in parallel or downstream to the print heads. Once the ink has been applied to the substrate by the printing system, the additional energy source may irradiate and as a result the ink may be partially cured, prior to the dispensing of the shaping fluid by the shaping fluid outlet.

According to some embodiments the additional energy-emitting source may include at least one energy-emitting source that may include a photon-emitting source that may emit for example at the UV range. The additional photon-emitting source may include LED, mercury lamp, Xenon lamp, laser or any combination thereof.

According to some embodiments, the additional energy-emitting source may emit light at a wavelength of about 350-450 nm. For example, the additional energy-emitting source may emit light at a wavelength of about 395 nm.

According to some embodiments, there is provided a method of printing including applying ink on a substrate and shaping the applied ink by dispensing a shaping fluid. The printing method can be used for example in drop on demand ink-jet printing. Shaping of the ink may include for example flattening of the applied ink. The shaping fluid may include any gaseous fluid, such as, but not limited to air, nitrogen, argon, carbon dioxide or any combination thereof.

According to other embodiments, the method of printing may further include emitting energy to at least partially cure the applied ink. The energy-emission may include photon-emission, electron emission or any combination thereof. The photon emission may include for example UV photon-emission that may be emitted for example by mercury lamp, light emitting diode (LED), Xenon lamp, laser or any combination thereof. Curing of the ink may be performed by energy emission after ink has been applied to the substrate and deformed by the shaping fluid. According to other embodiments, curing of the ink may be performed in two separate steps: Partial curing may be initiated by energy emission after ink has been applied to the substrate, prior to dispensing of the shaping fluid by the shaping fluid outlet. A second curing step may be performed by energy emission after the partially cured ink has been deformed by the shaping fluid dispensed from the shaping fluid outlet.

According to some embodiments, the method for printing may further include ink that may include a colorant at a concentration of at least about 4% (weight). The colorant may include a dye, pigment or any combination thereof. For example, the pigment may include an organic pigment, an inorganic pigment, or any combination thereof. The ink may further include a surfactant.

There is provided herein, according to some embodiments, a UV curable ink composition, comprising a colorant at a concentration of above 4% (weight), for example above 8% (weight), of the mixture.

UV-curable ink compositions may be comprised of the following ingredients: photoinitiator (or a combination of photoinitiators) that may comprise about 4% to about 10% (weight) of the ink composition; monomer (or a combination of monomers) that may comprise about 69% to about 96% (weight) of the ink composition; oligomer (or a combination of oligomers) that may comprise about 0% to about 20% (weight) of the ink composition; non curable volatile diluent (or a combination of diluents) that may comprise about 0% to about 20% (weight) of the ink composition; colorants (or a combination of colorants) that may include about 4% to about 10% (weight) of the ink composition; surfactant that may comprise about 0.1% to about 3% (weight) of the ink composition; or any combination thereof.

The ink composition may be a free radical UV-curable ink. The free radical ink compositions may be comprised of the following ingredients: free radical photoinitiator (or a combination of photoinitiators) that may comprise about 4% to about 10% (weight) of the ink composition; monomer (or a combination of monomers) that may comprise about 69% to about 96% (weight) of the ink composition; oligomer (or a combination of oligomers) that may comprise about 0% to about 20% (weight) of the ink composition; colorant (or a combination of colorants) that may include about 4% to about 10% (weight) of the ink composition; surfactant that may comprise about 0.1% to 5% (weight) of the ink composition.

The ink composition may be a cationic-curable UV ink. The cationic ink compositions may be comprised of the following ingredients: cationic photoinitiator (or a combination of photoinitiators) that may comprise about 1% to about 10% (weight) of the ink composition; monomer (or a combination of monomers) that may comprise about 30% to about 65% (weight) of the ink composition; oligomers (or combination of oligomers) that may comprise about 0% to about 30% of the ink composition; non curable volatile diluent (or a combination of diluents) that may comprise about 0% to about 30% (weight) of the ink composition; colorant (or a combination of colorants) that may include about 4% to about 10% (weight) of the ink; surfactant that may comprise about 0.1% to 5% (weight) of the ink composition.

According to some embodiments, UV-curable ink compositions are described herein. The ink composition may include photoinitiator (or a combination of photoinitiators), monomer (or a combination of monomers), oligomer (or a combination of oligomers), non-curable volatile diluent (or a combination of diluents), surfactant (or a combination of surfactant), colorant (or a combination of colorants) or any combination thereof.

According to some embodiments, the ink composition may be cured by a free radical mechanism, named herein free radical curable ink.

According to some embodiments, the free radical curable ink may include free radical photoinitiator. The free radical photoinitiator may include Hydroxy and alkoxy ketones; Aminoketones; Acyl phosphate, or any combination thereof. For example: hydroxy and alkoxy ketones containing photoinitiators may include such compounds as, but not limited to: Irgacure 184, Irgacure 500, Irgacure 651, Irgacure 2959, Darocur 1173, all may be obtained from Ciba Specialty Chemicals. Aminoketones containing photoinitiators may include such compounds as, but not limited to: Irgacure 369, Irgacure 907, all may be obtained from Ciba Specialty Chemicals. Acyl phosphate containing photoinitiators may include such compounds such as, but not limited to: Darocur TPO, Irgacure 819, all may be obtained from Ciba Specialty Chemicals. However, it should be clear to one of skill in the art that any applicable photoinitiator either known today or to be developed in the future, may be applicable to the present invention and is contemplated.

According to some embodiments, a free radical curable ink composition may include a monomer (or any combination of monomers). The monomer (or a combination of monomers) may include monofunctional acrylates, difunctional acrylates, trifunctional acrylates, polyfunctional acrylates, non-acrylic monomers, or any combination thereof. For example: Monofunctional acrylate monomers may include such compounds as, but not limited to: 2(2-ethoxyethoxy) ethyl acrylate, 2-phenoxyethyl acrylate, alkyl (C8-C13) acrylate, isobornyl acrylate, tetrahydrofurfuryl acrylate, cyclic trimethylolpropane formal acrylate, all may be obtained from Sartomer Co. Difunctional acrylate monomers may include such compounds as, but not limited to: hexanediol diacrilate and its alkoxylated derivatives, diethylene glycol diacrylate and its alkoxylated derivatives, bisphenol A diacrylate and its alkoxylated derivatives, triethylene glycol diacrylate and its alkoxylated derivatives, polyethylene (200-600) glycol diacrylate, neopentyl glycol diacrylate and its alkoxylated derivatives, all may be obtained from Sartomer Co. Trifunctional acrylate monomers may include such compounds as, but not limited to: trimethylolpropane tricrylate and its alkoxylated derivatives, glyceryl triacrylate and its alkoxylated derivatives, all may be obtained from Sartomer Co. Polyfunctional acrylate monomers may include such compounds as, but not limited to: di-trimethylolpropane tetraacrylate, dipentaerythritol pentaacrylate, all may be obtained from Sartomer Co. Non-acrylic monomers may include such compounds as, but not limited to: N-vinyl campolactame, may be obtained from BASF Corporation. However, it should be clear to one of skill in the art that any applicable monomer either known today or to be developed in the future, may be applicable to the present invention and is contemplated.

According to some embodiments, a free radical curable ink composition may include an oligomer (or any combination of oligomers) that may include low viscosity urethane acrylates, low viscosity epoxy acrylates, low viscosity polyether and polyester acrylates, or any combination thereof. For example: low viscosity urethane acrylates may include such compounds as, but not limited to: CN 9251, CN 922, may be obtained from Sartomer Co. Low viscosity epoxy acrylates may include such compounds as, but not limited to: CN 133, may be obtained from Sartomer Co. Low viscosity polyether and polyester acrylates may include such compounds as, but not limited to: Ebecryl 40, Ebecryl 81, Ebercyl 83, Viajet 100, Viajet 400, may be obtained from Cytec Co., CN 2881, may be obtained from Sartomer Co. However, it should be clear to one of skill in the art that any applicable oligomer either known today or to be developed in the future, may be applicable to the present invention and is contemplated.

According to some embodiments, the free radical curable ink may include a colorant. The colorant may include pigment, dye or any combination thereof The colorants may be transparent, unicolor or composed of any combination of available colors.

According to some embodiments, the colorant may be yellow organic pigment. For example, the yellow organic pigment may include such compounds as, but not limited to: Yellow Pigment 1, Yellow Pigment 3, Yellow Pigment 12, Yellow Pigment 13, Yellow Pigment 14, Yellow Pigment 17, Yellow Pigment 62, Yellow Pigment 65, Yellow Pigment 74, Yellow Pigment 81, Yellow Pigment 83, Yellow Pigment 97, Yellow Pigment 138, Yellow Pigment 139, Yellow Pigment 150, Yellow Pigment 151, Yellow Pigment 154, Yellow Pigment 168, Yellow Pigment 174, Yellow Pigment 176, Yellow Pigment 180, Yellow Pigment 183, Yellow Pigment 188, Yellow Pigment 191, or any combination thereof However, it should be clear to one of skill in the art that any applicable yellow organic pigment either known today or to be developed in the future, may be applicable to the present invention and is contemplated.

According to some embodiments, the colorant may be magenta organic pigment. For example, the magenta organic pigment may include such compounds as, but not limited to:

Pigment Red 2, Pigment Red 3, Pigment Red 5, Pigment Red 8, Pigment Red 12, Pigment Red 21, Pigment Red 22, Pigment Red 23, Pigment Red 31, Pigment Red 38, Pigment Red 48:1, Pigment Red 48:2, Pigment Red 48:3, Pigment Red 48:4, Pigment Red 49:1, Pigment Red 49:2, Pigment Red 53:1, Pigment Red 57:1, Pigment Red 81, Pigment Red 112, Pigment Red 122, Pigment Red 123, Pigment Red 144, Pigment Red 146, Pigment Red 149, Pigment Red 170, Pigment Red 175, Pigment Red 176, Pigment Red 177, Pigment Red 179, Pigment Red 185, Pigment Red 190, Pigment Red 202, Pigment Red 208, Pigment Red 224, Pigment Red 254, Pigment Violet 1, Pigment Violet 3, Pigment Violet 19, Pigment Violet 23, or any combination thereof. However, it should be clear to one of skill in the art that any applicable magenta organic pigment either known today or to be developed in the future, may be applicable to the present invention and is contemplated.

According to some embodiments, the colorant may be cyan organic pigment. For example, the cyan organic pigment may include such compounds as, but not limited to: Pigment Blue 15:0, Pigment Blue 15:1, Pigment Blue 15:2, Pigment Blue 15:3, Pigment Blue 15:4, Pigment Blue 17, Pigment Blue 17:1, Pigment Blue 27, Pigment Blue 60, Pigment Blue 61, or any combination thereof. However, it should be clear to one of skill in the art that any applicable cyan organic pigment either known today or to be developed in the future, may be applicable to the present invention and is contemplated.

According to some embodiments, the colorant may be black organic pigment. For example, the black organic pigment may include: Pigment Black 7. However, it should be clear to one of skill in the art that any applicable black organic pigment either known today or to be developed in the future, may be applicable to the present invention and is contemplated.

According to some embodiments, the free radical curable ink composition may include surfactant (or a combination of surfactants). For example, surfactant may include such compounds as, but not limited to: TegoRad 2250, TegoRad 2500, obtained from Degussa, Byk 341, obtained from BYK Chemie, Solsperse 3200, obtained from Avecia or any combination thereof. However, it should be clear to one of skill in the art that any applicable surfactant either known today or to be developed in the future, may be applicable to the present invention and is contemplated.

According to some embodiments, the free radical curable ink composition may include about 4% to about 10% (weight) of free radical photoinitiator (or a combination of photoinitiators). For example, the free radical ink composition may include a photoinitiator (or a combination of photoinitiators) that may comprise about 5.5% (weight) of the ink composition.

According to some embodiments, the free radical curable ink composition may include about 62% to about 92% (weight) of monomer (or a combination of monomers). For example, the ink composition may include a monomer (or a combination of monomers) that may comprise about 74.4% (weight) of the ink composition.

According to some embodiments, the free radical curable ink composition may include about 0% to about 20% (weight) of an oligomer (or a combination of oligomers). For example, the ink composition may include an oligomer (or a combination of oligomers) that may comprise about 16% (weight) of the ink composition.

According to some embodiments, the free radical ink composition may include about 0.1% to about 5% (weight) of surfactant (or a combination of surfactants). For example, the ink composition may include surfactant (or a combination of surfactants) that may comprise about 1% (weight) of the ink composition.

According to some embodiments, the free radical ink composition may include about 4% to about 10% (weight) of colorant (or a combination of colorants). For example, the ink composition may include colorant (or a combination of colorants) that may comprise about 6% (weight) of the ink composition. The colorant may include a yellow organic pigment that may comprise about 5% (weight) of the ink composition. The colorant may include a cyan organic pigment that may comprise about 4.6% (weight) of the ink composition. The colorant may include a magenta organic pigment that may comprise about 6% (weight) of the ink composition. The colorant may include a black organic pigment that may comprise about 4.8% (weight) of the ink composition.

According to some embodiments, the ink composition may include an ink composition that may be cured by the cationic mechanism, named herein cationic curable ink.

According to some embodiments, the photoinitiator of the cationic curable ink may include a cationic photoinitiator such as diaryliodonium, triarylsulfonium salts or ferrocene derivatives thereof as the reactive moiety. The cationic photoinitiator may comprise any of the formulations such as Esacure 1187, Esacure 1064 that may be obtained from Lamberty spa, Cyracure UVI 6992, Cyracure UVI 6976, obtained from Dow Corning. However, it should be clear to one of skill in the art that any applicable cationic photoinitiator either known today or to be developed in the future, may be applicable to the present invention and is contemplated.

According to some embodiments, the ink composition of the cationic curable ink may include a monomer (or a combination of monomers). For example the monomer (or combination of monomers) may include oxiranes and/or oxetanes moieties, such as but not limited to Cyracure UVR 6000, that may be obtained from Dow Corning; OXT 101, OXT 212, OXT 220, that may be obtained from Teagosei Co. The monomers may be cycloaliphatic epoxide based resins, such as but not limited to 3,4,epoxy cyclohexyl methyl, 3-4 epoxycyclohexane carboxylate. The monomers may include such compounds as, but not limited to Cyrcure UVR 6110, Cyracure UVR 6907, Cyracure UVR 6905 that may be obtained from Dow Corning. However, it should be clear to one of skill in the art that any applicable monomer either known today or to be developed in the future, may be applicable to the present invention and is contemplated.

According to some embodiments, the ink composition of the cationic curable ink may include oligomer (or a combination of oligomers). For example, an oligomer (or a combination of oligomers) may include polyethylene glycols. However, it should be clear to one of skill in the art that any applicable oligomers either known today or to be developed in the future, may be applicable to the present invention and is contemplated.

According to some embodiments, the ink composition of the cationic curable ink may include a non-curable volatile diluent (or a combination of diluents) that may be used in ink compositions cured by the cationic mechanism. For example: the diluent may include alcohols, esters, ketones such as, but not limited to ethanol, propanol, ethyl acetate, ethyleneglycol acetate, methyl ethyl ketone However, it should be clear to one of skill in the art that any applicable diluent either known today or to be developed in the future, may be applicable to the present invention and is contemplated.

According to some embodiments, the free radical curable ink composition may include surfactant (or a combination of surfactants). For example, surfactant may include such compounds as, but not limited to: TegoRad 2250, TegoRad 2500, obtained from Degussa, Byk 341, obtained from BYK Chemie, Solsperse 3200, obtained from Avecia or any combination thereof. However, it should be clear to one of skill in the art that any applicable surfactant either known today or to be developed in the future, may be applicable to the present invention and is contemplated.

According to some embodiments, the cationic curable ink may include colorant. The colorant may include pigment, dye or any combination thereof. The colorants may be transparent, unicolor or composed of any combination of available colors.

According to some embodiments, the colorant may be yellow organic pigment. For example, the yellow organic pigment may include such compounds as, but not limited to: Yellow Pigment 1, Yellow Pigment 3, Yellow Pigment 12, Yellow Pigment 13, Yellow Pigment 14, Yellow Pigment 17, Yellow Pigment 62, Yellow Pigment 65, Yellow Pigment 74, Yellow Pigment 81, Yellow Pigment 83, Yellow Pigment 97, Yellow Pigment 138, Yellow Pigment 139, Yellow Pigment 150, Yellow Pigment 151, Yellow Pigment 154, Yellow Pigment 168, Yellow Pigment 174, Yellow Pigment 176, Yellow Pigment 180, Yellow Pigment 183, Yellow Pigment 188, Yellow Pigment 191, or any combination thereof. However, it should be clear to one of skill in the art that any applicable yellow organic pigment either known today or to be developed in the future, may be applicable to the present invention and is contemplated.

According to some embodiments, the colorant may be magenta organic pigment. For example, the magenta organic pigment may include such compounds as, but not limited to: Pigment Red 2, Pigment Red 3, Pigment Red 5, Pigment Red 8, Pigment Red 12, Pigment Red 21, Pigment Red 22, Pigment Red 23, Pigment Red 31, Pigment Red 38, Pigment Red 48:1, Pigment Red 48:2, Pigment Red 48:3, Pigment Red 48:4, Pigment Red 49:1, Pigment Red 49:2, Pigment Red 53:1, Pigment Red 57:1, Pigment Red 81, Pigment Red 112, Pigment Red 122, Pigment Red 123, Pigment Red 144, Pigment Red 146, Pigment Red 149, Pigment Red 170, Pigment Red 175, Pigment Red 176, Pigment Red 177, Pigment Red 179, Pigment Red 185, Pigment Red 190, Pigment Red 202, Pigment Red 208, Pigment Red 224, Pigment Red 254, Pigment Violet 1, Pigment Violet 3, Pigment Violet 19, Pigment Violet 23, or any combination thereof However, it should be clear to one of skill in the art that any applicable magenta organic pigment either known today or to be developed in the future, may be applicable to the present invention and is contemplated.

According to some embodiments, the colorant may be cyan organic pigment. For example, the cyan organic pigment may include such compounds as, but not limited to: Pigment Blue 15:0, Pigment Blue 15:1, Pigment Blue 15:2, Pigment Blue 15:3, Pigment Blue 15:4, Pigment Blue 17, Pigment Blue 17:1, Pigment Blue 27, Pigment Blue 60, Pigment Blue 61, or any combination thereof. However, it should be clear to one of skill in the art that any applicable cyan organic pigment either known today or to be developed in the future, may be applicable to the present invention and is contemplated.

According to some embodiments, the colorant may be black organic pigment. For example, the black organic pigment may include: Pigment Black 7. However, it should be clear to one of skill in the art that any applicable black organic pigment either known today or to be developed in the future, may be applicable to the present invention and is contemplated.

According to some embodiments, the ink composition of the cationic curable ink may include about 1% to about 10% (weight) of a cationic photoinitiator (or a combination of photoinitiators). For example, the cationic ink composition may include a photoinitiator (or a combination of photoinitiators) that may comprise about 3% (weight) of the ink composition.

According to some embodiments, the ink composition of the cationic curable ink may include about 30% to about 65% (weight) of a monomer (or a combination of monomers). For example, the cationic ink composition may include a monomer (or a combination of monomers) that may comprise about 47% (weight) of the ink composition.

According to some embodiments, the cationic curable ink composition may include about 0% to about 30% (weight) of non curable volatile diluent (or a combination of diluents). For example, the ink composition may include diluent (or a combination of diluents) that may comprise about 10% (weight) of the ink composition.

According to some embodiments, the cationic curable ink composition may include about 0.1% to about 5% (weight) of surfactant (or a combination of surfactants). For example, the ink composition may include a surfactant (or a combination of surfactants) that may comprise about 1% (weight) of the ink composition.

According to some embodiments, the cationic curable ink composition may include about 4% to about 10% (weight) of colorant (or a combination of colorants). For example, the ink composition may include colorant (or a combination of colorants) that may comprise about 6% (weight) of the ink composition. The colorant may include a yellow organic pigment that may comprise about 5% (weight) of the ink composition. The colorant may include a cyan organic pigment that may comprise about 4.6% (weight) of the ink composition. The colorant may include a magenta organic pigment that may comprise about 6% (weight) of the ink composition. The colorant may include a black organic pigment that may comprise about 4.8% (weight) of the ink composition.

According to some embodiments, the UV-curable ink composition may include a mixture of ink compositions of both free radical curable ink composition and cationic curable ink composition.

According to some embodiments, the ink mixture of a free radical curable ink and a cationic curable ink compositions may include about 5% (weight) to about 85% (weight) of a free radical curable ink composition and; about 15% (weight) to about 95% (weight) of a cationic curable ink compositions. For example, the ink mixture may include a free radical curable ink composition that comprises about 12.5% (weight) of the ink mixture and; a cationic curable ink composition that comprises about 87.5% (weight) of the ink mixture.

According to some embodiments, the UV-curable ink composition may exhibit a viscosity value of about 10 to about 50 CentiPoises (cP) at room temperature or about 10 to about 20 cP at working temperature. The working temperature may be from about 20° C. to about 80° C.

According to some embodiments, when printing with the UV-curable ink composition described herein using the described above printing module (FIG. 2, 220) a reflection color density of 1.9-2 for Cyan, 1-1.2 for Yellow, 1.3-1.4 for Magenta and 1.8-2 for Black (all values are Status-T, a wide band response which is an accepted standard in USA) may be achieved by a smaller number of ink drops as compared to when printing with the currently used UV-curable ink on the currently used printing module (FIG. 1, 120). Consequently, images printed using the UV-curable ink composition described herein using the described above printing module (FIG. 2, 220) may exhibit graininess higher than can be achieved by using the currently used UV-curable ink printed on the currently used printing module (FIG. 1, 120). The higher graininess appears due to larger dot size in the case of using the UV-curable ink composition described herein and the described above printing module (FIG. 2, 220).

A reflection color density may be defined as a logarithm of the reciprocal of the percentage of light reflected from an object.

Figure 4A:
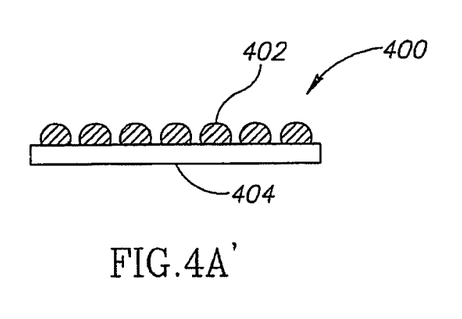
FIG. 4A schematically illustrates a close-up view of ink drops density of images printed using UV-curable inks.
Figures 4B, 4C:
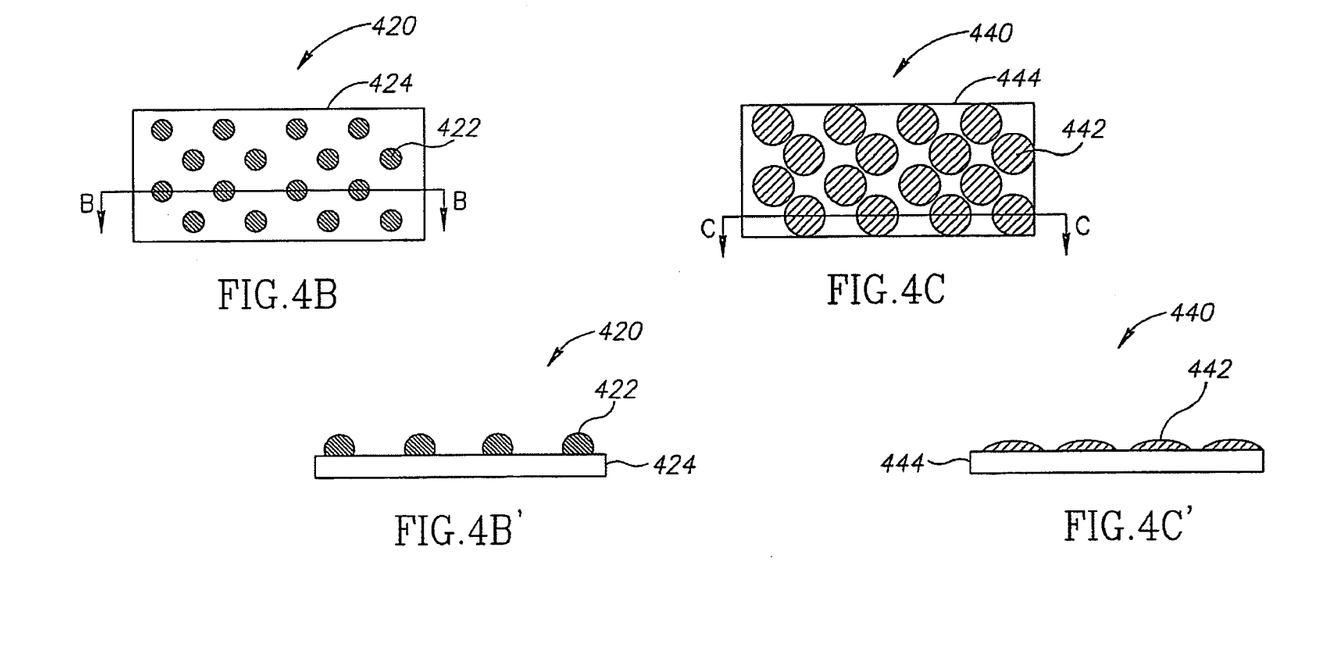
FIG. 4B schematically illustrates a close-up view of ink drops density of images printed using UV-curable inks.
FIG. 4C schematically illustrates a close-up view of ink drops density of images printed using UV-curable inks.

FIG. 4 schematically illustrates, according to some exemplary embodiments, a difference between a sample printed image of UV-curable ink using an existing printing module (such as the printing module described in FIG. 1, 120) and the UV-curable ink composition described herein printed by a printing module, according to embodiments of the disclosure (such as the printing module described in FIG. 2, 220).

FIGS. 4A and A' schematically illustrates a close-up view of an existing printed image 400 of existing UV-curable ink using an existing printing module (such as the printing module described in FIG. 1, 120) (FIG. 4A being a top view of image 400, and FIG. 4A' is a cross sectional view of image 400 of FIG. 4A, taken along line A-A). Ink drops (such as ink drop 402) are spread onto a substrate 404, providing a color density X. The diameter of each droplet may be, for example, in the range of 100-120 micron (depending on the substrate).

FIGS. 4B and 4B' schematically illustrates a close-up view of a printed image 420 of the UV-curable ink composition described herein, printed by a printing module, according to embodiments of the disclosure (such as the printing module described in FIG. 2, 220), prior to dispensing of the shaping fluid on the ink droplets. FIG. 4B is a top view of image 420 and FIG. 4B' is a cross sectional view of image 420 of FIG. 4B, taken along line B-B. Ink drops (such as ink drop 422) are deposited onto a substrate 424. The diameter of each droplet may be, for example, in the range of 100-120 micron (depending on the substrate).

FIGS. 4C and 4C' schematically illustrates a close-up view of a printed image 440 of the UV-curable ink composition described herein, printed by a printing module, according to embodiments of the disclosure (such as the printing module described in FIG. 2, 220), after deformation (shown here as flattening) of the ink droplets (such as ink droplet 442) by the shaping fluid. FIG. 4C is a top view of image 440 and FIG. 4C' is a cross sectional view of image 440 of FIG. 4C, taken along line C-C. As a result of dispensing the shaping fluid, the diameter of each ink drop (such as ink drop 442) on a substrate (444) increases (for example, from a droplet diameter of 100-120 micron to about 160-200 micron, depending on substrate). Consequently, the number of droplets of the UV-curable ink composition described herein (such as, FIG. 4C, 442) needed to achieve a color density of X, is smaller than the number of droplets needed in the case of the existing printing modules and UV-curable ink (such as in FIG. 4A, 402) to achieve the same color density of X. This may be explained by the larger diameter of the ink drops (such as FIG. 4C, 442) and by the higher concentration of colorant of the UV-curable ink composition described herein. In this manner, a smaller number of drops (such as FIG. 4C, 442) having larger diameter (as illustrated in FIG. 4C), a flatter shape (as illustrated in FIG. 4C') and a composition that includes a higher colorant content, may cover a similar printing area and thus provide a similar color density, X. X may represent any color density value. Ink drops illustrated in FIG. 4 (such as ink drop 402, ink drop 422 and ink drop 442) are not limited to any color or texture and may represent ink drops of any color.

According to some embodiments, images printed using the UV-curable ink composition described herein on the printing module described above (such as printing module 220 in FIG. 2), may exhibit higher glossiness as compared to images printed using the currently used UV-curable ink. Higher glossiness may be achieved because of the chemical properties of the UV-curable ink composition described herein and because of the method of printing that may yield flatter drops on the substrate, which increase glossiness of the printed image.

According to some embodiments, the printing device and printing method described above may be used for printing 3-dimensional (3D) printings.

According to some embodiments, there is provided a method for printing, the method includes applying curable ink (as described herein) on a substrate and shaping the applied ink by dispensing a shaping fluid, as referred to herein. The method may further include at least partially curing the ink by energy emission, as referred to herein.

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations as are within their true spirit and scope.

EXAMPLES

An example of a free radical curable ink composition, according to some embodiments is described in table 1 herein. Each composition described yields one colored ink, as indicated:

TABLE 1

|  | CYAN | MAGENTA | YELLOW | BLACK |
|---|---|---|---|---|
| Isobornyl Acrylate | 39.1 | 41.4 | 39.6 | 34.9 |
| Isodecyl acrylate | 10 | 10 | 10 | 10 |
| N-Vinyl Caprolactame | 23 | 23 | 23 | 23 |
| Ebecryl 40 | 16 | 12 | 15 | 18 |
| Irgacure 369 | 1.5 | 1.5 | 1.5 | 1.5 |
| Darocure TPO | 4 | 4 | 4 | 6 |
| Solsperse 3200 | 0.8 | 1.1 | 0.9 | 0.8 |
| Irgalite Blue GLO (PB 15:3) | 4.6 | — | — | — |
| Toner HG (P.Y.180) | — | — | 5 | — |
| Hostaperm Pink E02 (P.R. 122) | — | 6 | — | — |
| Mogul E (Carbon Black) | — | — | — | 4.8 |
| BYK 341 | 1 | 1 | 1 | 1 |

What we claim is:

1. A printing device comprising:
   a platform to carry a substrate;
   an ink applicator adapted for applying curable ink onto said substrate when carried by the platform; and
   a shaping fluid outlet, which after a time delay following the application of said ink is adapted to dispense a shaping fluid onto said ink on said substrate, wherein the shaping fluid outlet is positioned adjacent said ink applicator and at an acute angle relative to an imaginary line that is perpendicular to said substrate-carrying platform.

2. The device according to claim 1, further comprising at least one energy emitting source adapted to at least partially cure said ink.

3. The device of claim 2, wherein said energy emitting source is located downstream to said ink applicator.

4. The device of claim 2, wherein said energy emitting source is located upstream to said ink applicator.

5. The device according claim 2, wherein said energy emitting source is located substantially parallel to said ink applicator.

6. The device of claim 2, wherein said energy-emitting source comprises a photon-emitting source, an electron-emitting source or any combination thereof.

7. The device of claim 6, wherein said photon-emitting source comprises a UV photon-emitting source.

8. The device of claim 2, wherein said energy emitting source is adapted to emit energy at a time delay after dispensing the shaping fluid onto the ink.

9. The device of claim 2, wherein the energy-emitting source is situated at a changeable distance from said ink applicator.

10. The device of claim 9, wherein the distance is adjustable within a range of 0 to 1500 mm.

11. The device of claim 1, wherein said shaping fluid outlet is located downstream to said ink applicator.

12. The device of claim 1, wherein said shaping fluid outlet is located upstream to said ink applicator.

13. The device of claim 1, wherein said shaping fluid outlet is located substantially parallel to said ink applicator.

14. The device of claim 1, wherein the distance between said shaping fluid outlet and said ink applicator is adjustable within a range of 0-800 mm.

15. The device of claim 1, wherein said shaping fluid comprises a fluid in a gaseous state.

16. The device of claim 15, wherein said shaping fluid comprises air, nitrogen, argon, carbon dioxide or any combination thereof.

17. The device of claim 1, wherein the time delay is between 0-120 seconds.

18. A method for printing comprising:
providing a platform to carry a substrate;
applying, by an applicator, a curable ink onto said substrate when carried by the platform; and
after a time delay following the application of said ink, shaping the applied ink by dispensing a shaping fluid onto said ink on said substrate by a shaping fluid outlet positioned adjacent said applicator and at an acute angle relative to an imaginary line that is perpendicular to said substrate-carrying platform.

19. The method of claim 18, further comprising at least partially curing the ink by energy emission.

20. The method of claim 19, wherein the energy-emission comprises photon-emission, electron emission or any combination thereof.

21. The method of claim 20, wherein the photon emission comprises UV photon-emission.

22. The method of claim 18, wherein shaping the applied ink comprises deforming the ink.

23. The method of claim 22, wherein the curable ink composition further comprises a surfactant.

24. The method of claim 18, wherein the shaping fluid comprises a fluid in a gaseous state.

25. The method of claim 18, wherein the shaping fluid comprises air, nitrogen, argon, carbon dioxide or any combination thereof.

26. The method of claim 18, wherein the curable ink composition comprises a colorant at a concentration of above 4% (weight).

27. The method of claim 26, wherein the colorant comprises a dye, pigment or any combination thereof.

28. The method of claim 18, wherein the curable ink composition comprises a colorant at a concentration of above 8% (weight).

* * * * *

UNITED STATES PATENT AND TRADEMARK OFFICE
CERTIFICATE OF CORRECTION

PATENT NO. : 8,182,078 B2  
APPLICATION NO. : 11/723824  
DATED : May 22, 2012  
INVENTOR(S) : Gregory Nakhmanovich et al.

Page 1 of 1

It is certified that error appears in the above-identified patent and that said Letters Patent is hereby corrected as shown below:

In the Claims:

In column 22, line 56, in Claim 1, delete "to dispense" and insert -- to start dispensing --, therefor.

In column 23, line 1, in Claim 5, after "according" insert -- to --.

In column 24, line 4, in Claim 18, delete "dispensing" and insert -- starting to dispense --, therefor.

Signed and Sealed this
Sixteenth Day of April, 2013

Teresa Stanek Rea
*Acting Director of the United States Patent and Trademark Office*